G. F. HARTLEY.
SHAFT BENDING MACHINE.
APPLICATION FILED AUG. 8, 1908.
905,423.
Patented Dec. 1, 1908.
5 SHEETS—SHEET 2.
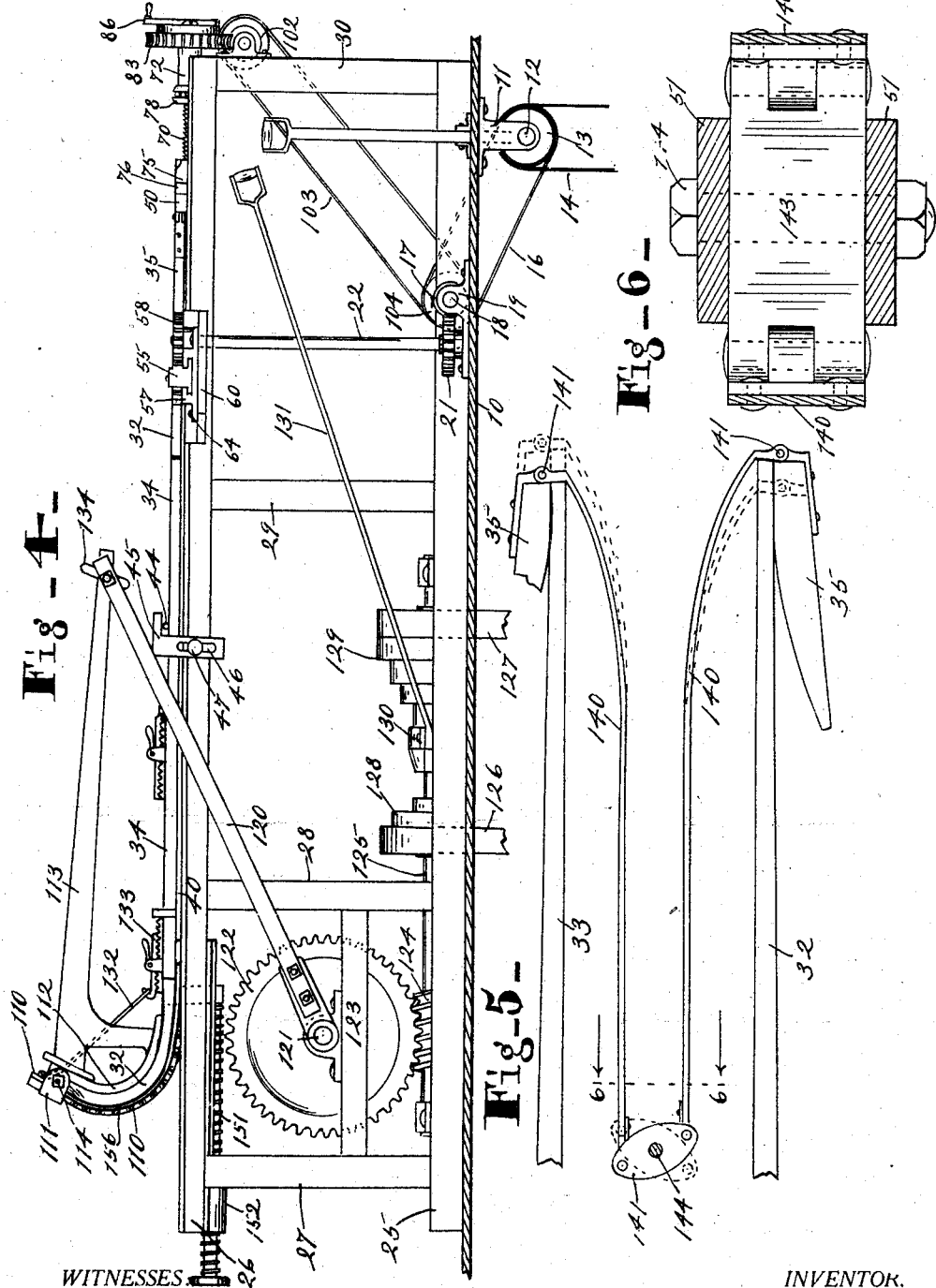
WITNESSES
O. M. Greener
W. M. Gentle
INVENTOR.
George F. Hartley.
BY
V H Lockwood
ATTORNEY.

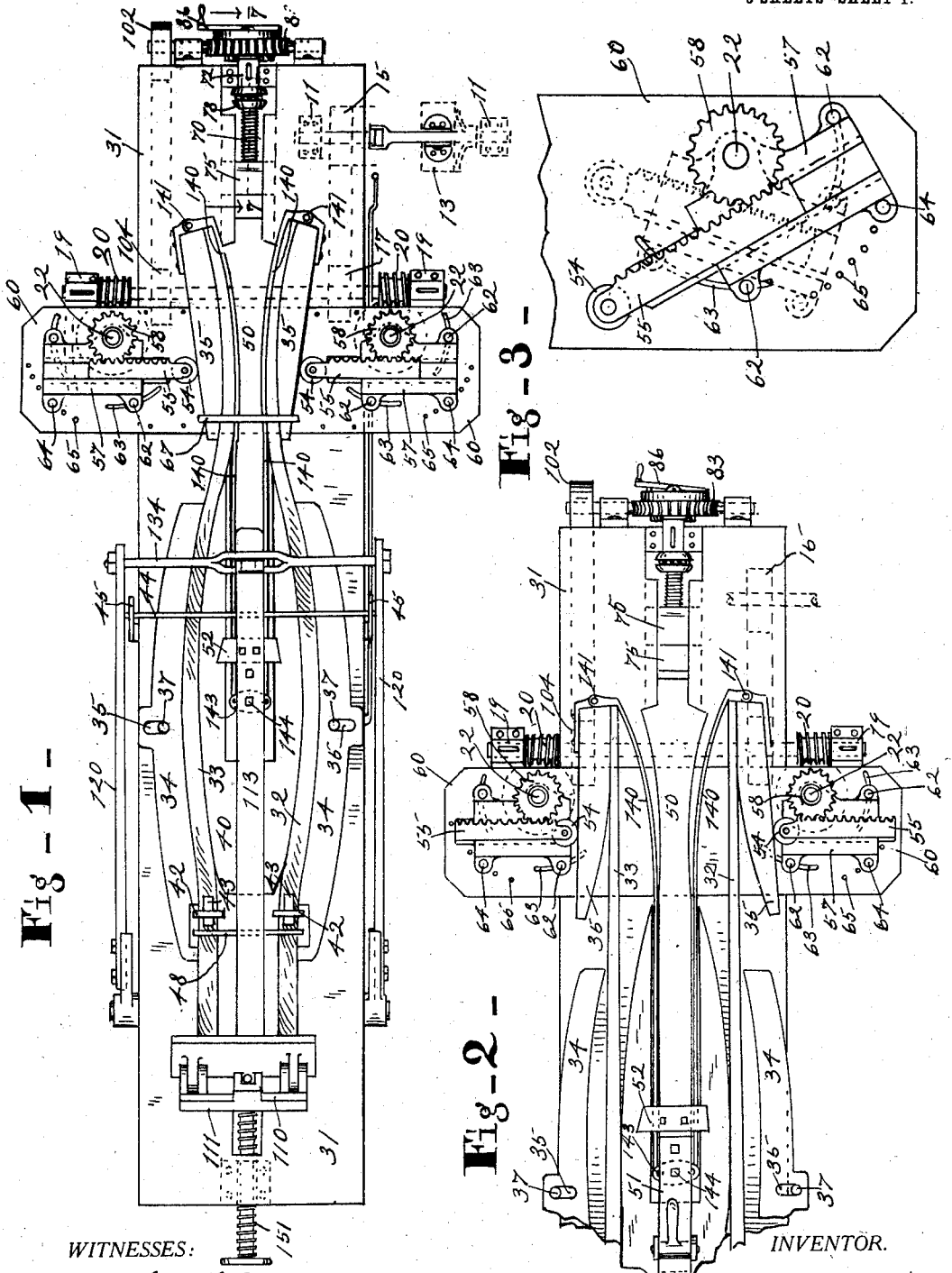

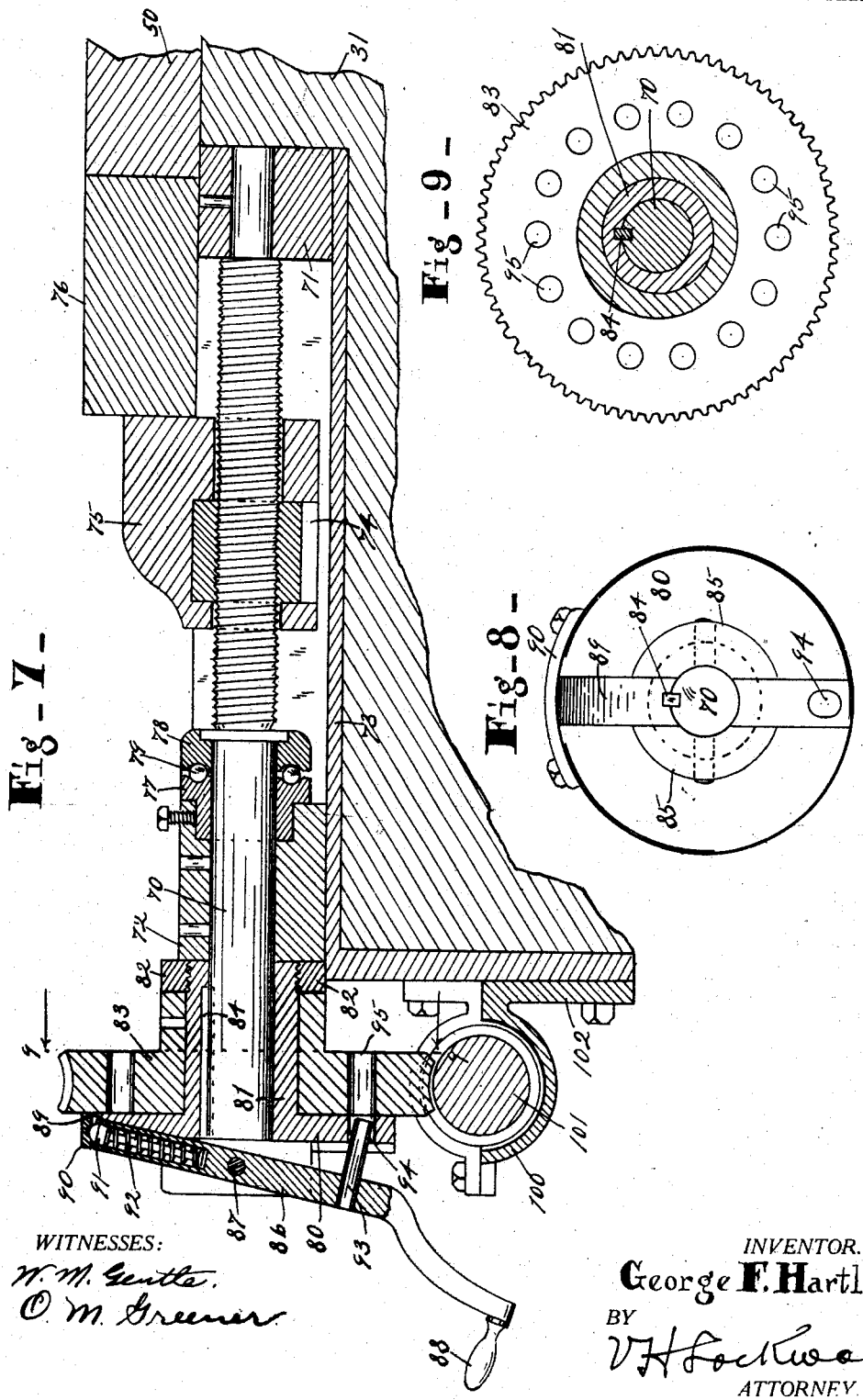

G. F. HARTLEY.
SHAFT BENDING MACHINE.
APPLICATION FILED AUG. 8, 1908.
905,423.
Patented Dec. 1, 1908.
5 SHEETS—SHEET 4.
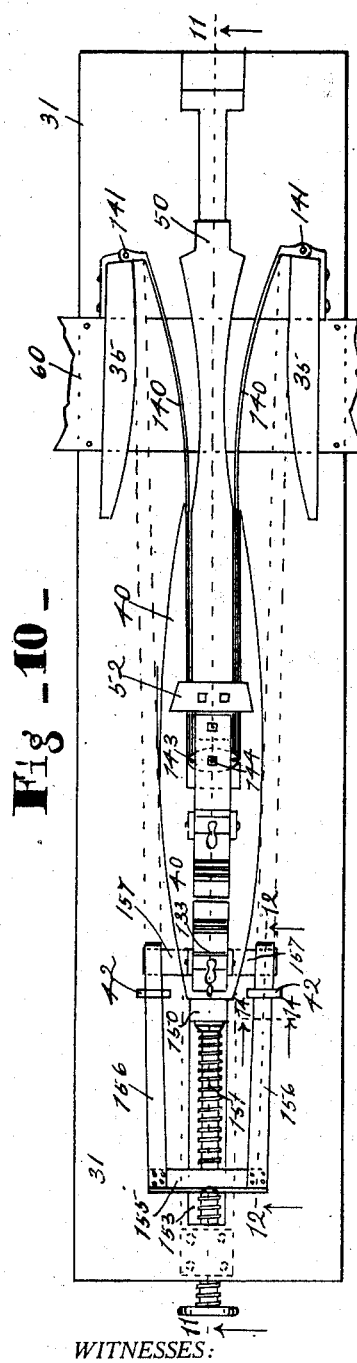
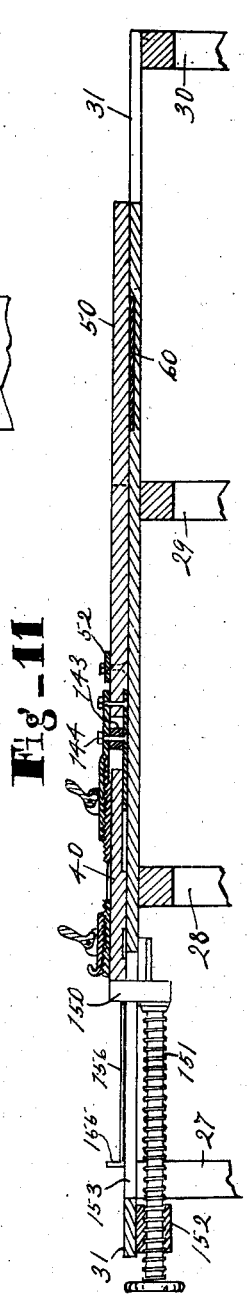
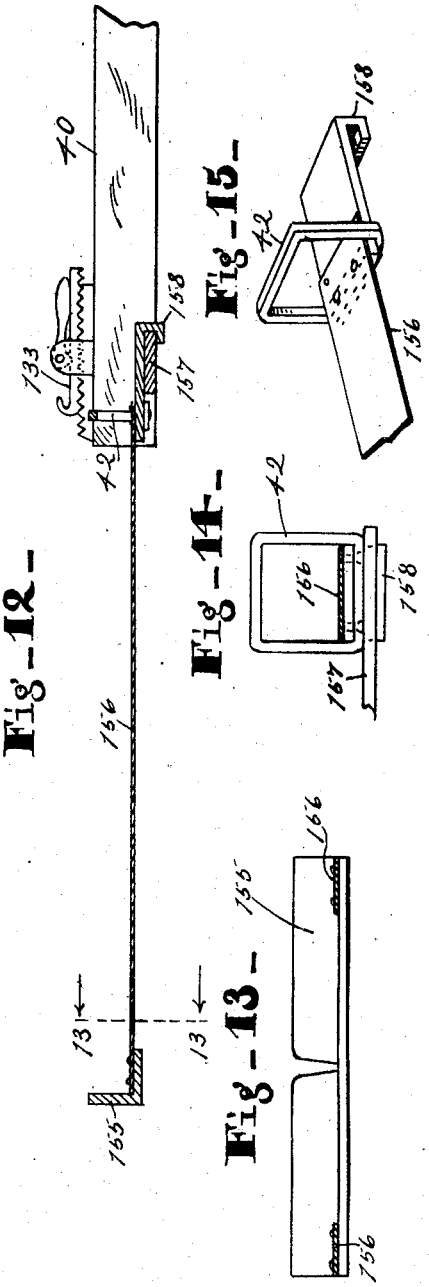
WITNESSES:
W. M. Gentle
O. M. Greener
INVENTOR.
George F. Hartley.
BY
V. H. Lockwood
ATTORNEY.

G. F. HARTLEY.
SHAFT BENDING MACHINE.
APPLICATION FILED AUG. 8, 1908.

905,423.

Patented Dec. 1, 1908.
5 SHEETS—SHEET 5.

WITNESSES:
W. M. Gentle.
O. M. Greener.

INVENTOR.
George F. Hartley.
BY
V. H. Lockwood
ATTORNEY.

UNITED STATES PATENT OFFICE.

GEORGE F. HARTLEY, OF MUNCIE, INDIANA, ASSIGNOR TO THE PIONEER POLE AND SHAFT COMPANY, OF PIQUA, OHIO, A CORPORATION OF NEW JERSEY.

SHAFT-BENDING MACHINE.

No. 905,423.          Specification of Letters Patent.          Patented Dec. 1, 1908.

Application filed August 8, 1908. Serial No. 447,534.

*To all whom it may concern:*

Be it known that I, GEORGE F. HARTLEY, of Muncie, county of Delaware, and State of Indiana, have invented a certain new and useful Shaft-Bending Machine; and I do hereby declare that the following is a full, clear, and exact description thereof, reference being had to the accompanying drawings, in which like letters refer to like parts.

The object of this invention is to improve the construction and operation of machines for shaping and forming shafts for vehicles such as shown in the Letters Patent to James N. Chapman, No. 665,179, issued January 1, 1901.

The chief feature of the invention consists in providing upsetting straps so mounted and arranged as to automatically adjust themselves to shafts of varying lengths, and of a center board in connection with which said upsetting straps are mounted for actuating said upsetting straps and holding the same under tension against the ends of the shafts as they are being shaped and formed.

Another feature of the invention consists in combining said movable center board and laterally movable pressure bars for forming the forward ends of the shafts, and means for simultaneously and proportionately actuating both the center board and said pressure bars whereby they will coöperate in shaping the shafts. In this connection I also provide horizontally adjustable bearing plates for said laterally movable pressure bars whereby the direction of movement and the point of pressure of said bars can be adjusted according to the length of the shafts.

Figure 16:
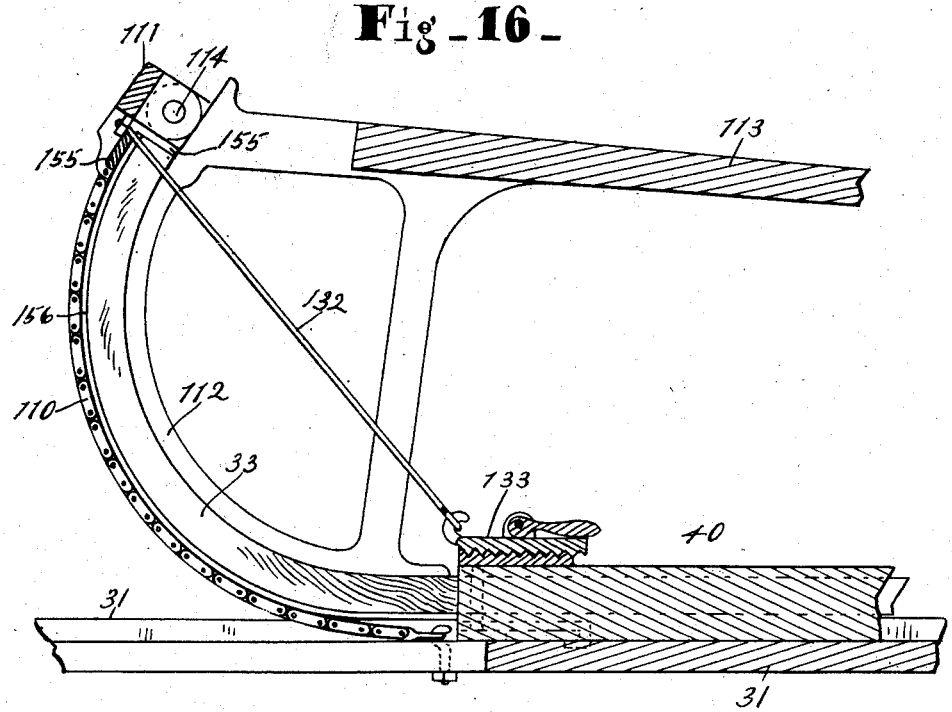
Figure 17:
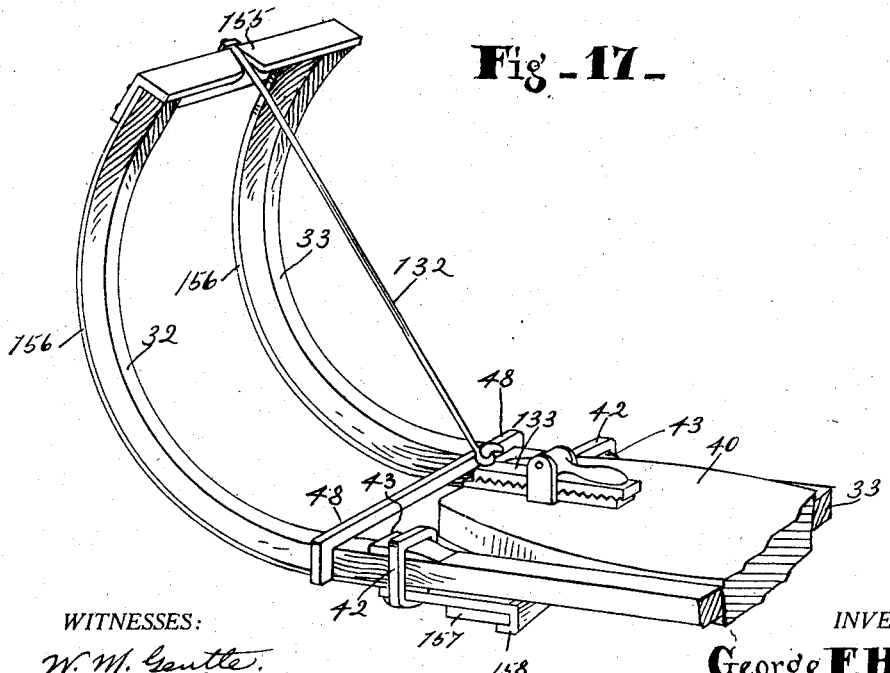

The full nature of this invention will be understood from the accompanying drawings and the following description and claims:

In the drawings Figure 1 is a plan view of the shaft bending machine with a pair of shafts shown after they have been bent. Fig. 2 is the same as the right hand portion of Fig. 1 before the shafts are bent. Fig. 3 is a plan view of a portion of the device, showing the point pressure bar mechanism in one position in full lines and an altered position in dotted lines. Fig. 4 is a side elevation of the device mounted on the floor, which is shown in section, and parts being broken away, and the machine shown operated. Fig. 5 is a plan view of the ends of a pair of shafts and the upsetting straps and automatic means for adjusting the upsetting straps to shafts of varying lengths, parts being broken away. Fig. 6 is a section on the line 6—6 of Fig. 5. Fig. 7 is a section on the line 7—7 of Fig. 1. Fig. 8 is an end elevation of the means for holding the handle for actuating the center plate. Fig. 9 is a section on the line 9—9 of Fig. 7. Fig. 10 is a plan view of the top of the table with parts thereon in their unoperated positions and the position of the shafts when first put in place being indicated by dotted lines. Fig. 11 is a central vertical section on the line 11—11 of Fig. 10. Fig. 12 is a vertical section on the line 12—12 of Fig. 10, but on a larger scale and with parts omitted. Fig. 13 is a section on the line 13—13 of Fig. 12. Figs. 14 and 15 are detail views of the stirrup construction at the inner end of the center board for holding the shafts in place after being inserted. Fig. 16 is a vertical longitudinal section through a portion of the device that bends the heel of the shaft, parts being broken away and a shaft being shown bent. Fig. 17 is a perspective view of the heels of the shafts bent and the means for holding the same bent.

The machine herein shown, as appears in Fig. 4, is mounted on the floor 10, carrying on its under side the hanger 11 shown by dotted lines in Fig. 1, which carries the pulley shaft 12 on which a driving pulley 13 is mounted, which is driven by a belt 14 from some suitable source of power. The shaft 12 also carries a pulley 15 having a belt 16 that runs to a pulley secured on the shaft 18 having bearings 19 secured on the floor, see Figs. 1 and 4. The shaft 18 has right and left-hand worms 20, see Fig. 1, that engage and actuate the worm wheels 21 secured in the lower end of the shaft 22 mounted in a vertical position, one on each side of the machine frame.

The frame of the machine is made of parts joined together in rectangular order and consists of lower inner beams or members 25, upper inner beams or members 26 and vertically disposed beams or members 27, 28, 29 and 30, as shown in Fig. 4. A table 31 is secured upon said frame. Upon it are located a pair of shafts 32 and 33, oppositely disposed and also the bending formers 34. The formers or sharpers 34 lie against the outer sides of the central portion of the shafts, as shown in Fig. 1 and rest movably upon the top 31, each being centrally provided with a slot 35 through which pins project from suitable means (not shown) for pressing the shapers 34 toward each other. These shapers 34 are moved inwardly towards each other for shaping the shafts by pressing them against the center plate 40 that lies upon the table 31 between the pair of shafts.

The center board construction consists of a relatively stationary part 40 and a relatively movable part 50 connected as hereafter explained. The plate 40 is held from relative movement by the stop block 150 mounted on the end of the screw 151 carried in the bearing 152 beneath the table 31, as shown in Fig. 11. Therefore, the stop block 150 is adjustable but when it is adjusted it serves as a stop or abutment for the left hand end of the center plate 40 so that said plate 40 is relatively stationary after such adjustment. The stop block 150 projects upwardly through a slot 153 in the table.

The shafts are placed upon the table one on each side of the center plates 40 and 50 and each shaft is projected through one of the rings 42 until its end abuts against the angle plate 155 secured to the ends of two straps 156 that are parallel and pass through the rings 42 and are provided at their right hand ends with downwardly projecting hooks 158, see Fig. 15, that catch over the bars 157 secured to the center plate 40. After the shafts are thus placed their right hand ends lie between the shapers or formers 35 and the upsetting straps 140, as appears in Fig. 10, and they lie between the center plate 40 and the formers 34. There is also a rod 44 that lies over the shafts, formers 34 and board 40 for temporarily holding them down on the table 31, the ends of said rod 44 being clamped down by hooks 45 adjustably mounted on the sides of the frame, as seen in Figs. 1 and 4, said hooks consisting of plates with vertical slots 46 through which headed set screws 47 project from the frame. These set screws clamp the hooks 45 in place. After a pair of shafts have been bent they are clamped against the edges of the plate 40 by the clamping rod 48, which is a plain rod with turned-down ends. Therefore, after the shafts have been formed and the clamping rod 48 is in place, the rod 44 is removed and the shafts and parts 40, 50, 35 and attachments taken up and removed in united condition and put into a place where the shafts will dry in the position in which they are at the time clamped.

The forward ends of the shafts are formed and shaped by the following means.

The right hand plate 50 of the center board construction is connected with the plate 40 by the metal plate 51. A transverse plate 52 is secured to the plate 50 and that spans the slot in the plate 40 and has its two ends resting upon the plate 40 to prevent twisting of the plate 50. The right hand portion of the plate 50 is curved to shape the forward ends of the shafts, which lie between the center plate 50 and the formers or shapers 35.

The formers 35 are pressed inwardly towards each other by the pressure bars 55 that carry on their inner ends rollers 54 that engage the formers 35. The bars 55 are rack bars slidably mounted in the bearing plate 57 and actuated by the gears 58 on the upper ends of the vertical shafts 22, which have heretofore been described. Said rack bars 55 simultaneously press inwardly against the blocks 35 to force the shafts against the plate 50. The bearings 57 are adjustably mounted on the transverse plate 60 that is secured on the table 31. Said bearings are pivoted to the shafts 22 and have pins 62 at opposite corners that project loosely through slots 63 in said plate 60 that are curved concentrically with shaft 22, and said bearing plates 57 are held in their adjusted positions by pins 64 that are adapted to be inserted in one of a series of holes 65 in the plate 60. When the right hand ends of the shafts are thus formed they are locked in their bent position by the clamping rod 67 which overlaps the formers 35 and is similar to the clamping rod 48. The adjustment of the bearing 57 is illustrated in Fig. 3. As the shafts recede while the bending by the formers 35 is taking place, the center plate 50 is forced to the left by means shown at the right hand end of Fig. 1 and in Fig. 7. The screw shaft 70 is mounted at its inner end in the bearings 71 and at its outer end in the bearings 72 fastened to the angle plate 73 that is secured to and embodied within one end of the table 31. The central portion of the shaft 70 is threaded and carries a nut 74 that is embodied in the sliding block 75 which abuts against the intermediate block 76 that in turn abuts against the outer end of the center board 50. The ball bearing consisting of the parts 77 and 78 and balls 79 is provided to resist the thrust of the shaft 70. Said shaft 70 carries on its outer end a disk 80 with an inwardly extending sleeve 81 that at its inner end is externally threaded to receive the nut 82. Upon said hub 81 a worm wheel 83 is mounted. The hub 81 is keyed to the shaft 70 by the key 84. On the outer face of the disk 80 are a pair of flanges 85 between which the hand lever 86 lies and to which it is pivoted by the pin 87. A handle 88 is on the lower end of said lever and the upper end is adapted, when the lower end is pulled outwardly, to move inwardly into a recess 89 in the disk 80. Over said recess and on said disk there is a plate 90 that is engaged by the upper end of the plunger 91 mounted in the upper end of the lever 86 and pressed outwardly by the spring 92 when the lower end of the lever is in its inward position. This is to maintain the lower end of the lever in such inward position while the device is being operated. The upper end of said plunger 91 is oval so that when the lower end of the lever 86 is pulled outwardly, the plunger will move inwardly below the plate 90, as shown in Fig. 7. The lever 86 is locked in actuating position with the worm wheel 83 by the pin 93 projecting through the aperture 94 in the disk 80 into one of the apertures 95 in the worm wheel. This mechanism is merely to throw the shaft 70 into operative engagement with the worm wheel 83. Said worm wheel is actuated by a worm 100 on the shaft 101 that is mounted transversely of the frame at the right hand end of the bearing brackets 102, see Figs. 1 and 7, and said shaft 101 is driven by a belt 103 running from a pulley 104 on the shaft 18.

As the shafts are being bent they must be upset or held from longitudinal movement so that the convex portions of the shafts will not stretch and break or weaken and the concave portions will be compressed and the fibers more or less forced together, as is well understood by those familiar with the art of bending wood. The shafts are thus held by the upsetting straps 140, see Fig. 5. These straps bear against the outer ends of the shafts and are pivotally connected at 141 with the forming blocks 35. Since shafts are liable not to be of exactly the same length, it is observed that this upsetting means is so arranged as to accommodate itself automatically to shafts of varying lengths. This is effected by the ends of said upsetting straps 140 being pivoted to block 143 at points on opposite sides of the pivot 144 through said blocks and the plates 51 on the inner end of the center plate 50, so that said block 143 will yield one way or the other as indicated in Fig. 5, to adjust the upsetting straps to the shafts.

After the shafts are first put in place and before they are bent, as has been stated, the center board 50 is moved up snugly into place by hand and that forces the upsetting straps tightly against the ends of the shafts. Then the mechanism is thrown into gear and it causes the simultaneous movement of the center board 50 and the upsetting straps 140 and the pressure bars 55 that actuate the shapers 35. In other words, all these parts bodily and simultaneously move, act and coöperate in the bending and shaping and upsetting of the shafts and the upsetting straps follow up the shafts as they are in the process of bending and shaping and continue to maintain them in a longitudinally compressed and upset condition, whereby the shafts will be quickly and truly shaped without breaking the fiber thereof and regardless of the variations in the lengths of the shafts.

The heels of the shafts are bent by means shown in Figs. 1, 4 and 16. Flexible means, such as the chains 110 are secured at one end to the table 31 and at the other end to ears on the bar 111 which is pivotally connected by suitable ears and the rod 114 to the segmental shaper 112 on the end of the lever 113. Said lever 113 is actuated by the arms 120 that are secured to the shaft 121 on the gear wheel 122 mounted in bearings on the cross bars 123 on the frame and meshing with the worm 124 on the shaft 125 mounted longitudinally on the frame in the lower part thereof and driven by the belts 126 and 127 and pulleys 128 and 129 controlled by the clutch 130 and regulated by a clutch rod 131. The arms 120 actuate the lever 113 by the rod 134 connected at each end to arms 120 and centrally slotted to receive the end of lever 113.

When the heels of the shafts are bent as shown in Figs. 4 and 16, they are held in such position by the removable rod 132 extending from bar 155 to the clamped catch 133 on the center plate 40. The other parts of the shafts are held in place against the center plate construction by the rods 48 and 67, so that after the lever 113 with its shaper 112 and also the rod 44 are removed, the center board construction with the shafts connected therewith can be lifted off the table and removed to a suitable place for drying the same and while drying the parts to which the shafts are clamped will hold the shafts in their proper form.

What I claim as my invention and desire to secure by Letters Patent is:

1. A shaft bending machine including means for bending a pair of shafts, and means for upsetting said shafts and maintaining them in an upset condition while being bent which means is automatically adjustable to shafts of varying lengths.

2. A shaft bending machine including a frame adapted to receive a pair of shafts, means thereon for bending the same, means against which one end of each shaft abuts, a pair of upsetting straps for engaging the other ends of said shafts, means pivotally holding and connecting said upsetting straps so that they will yield with relation to each other and automatically adjust themselves to shafts of varying lengths.

3. A shaft bending machine including a frame adapted to receive a pair of shafts, means for bending the same, means against which one end of each shaft abuts, a pair of upsetting straps engaging the other ends of said shafts, and a centrally pivoted movable block to which said upsetting straps are pivoted at points opposite said central pivot, substantially as set forth.

4. A shaft bending machine including a frame adapted to receive a pair of shafts, means for bending the same, means against which one end of each shaft abuts, a movable center plate between the shafts, a block pivoted to said center plate, and upsetting straps pivotally connected with said block on opposite sides of its pivot that engage the free ends of said shafts and upset the same when said center plate is moved.

5. A shaft bending machine including a frame adapted to receive a pair of shafts, a movable center board construction between said shafts, means for bending and shaping the shafts, and means for simultaneously actuating said movable center board construction and said shaft bending means.

6. A shaft bending machine including a frame adapted to receive a pair of shafts, a movable center board construction between said shafts, means for bending and shaping the shafts, and a single means for simultaneously actuating said movable center board construction and said shaft bending means.

7. A shaft bending machine including a frame adapted to receive a pair of shafts, a movable center board construction between said shafts, means for bending and shaping the shafts, upsetting straps pivoted to said center board construction for engaging the ends of the shafts and upsetting the same, and means for simultaneously actuating said movable center board carrying the upsetting straps and also said bending means.

8. A shaft bending machine including a frame adapted to receive a pair of shafts, a movable center board construction between said shafts, means for bending and shaping the shafts, upsetting straps pivoted to said center board construction for engaging the ends of the shafts and upsetting the same, and a single means for simultaneously actuating said movable center board carrying the upsetting straps and also said bending means.

9. A shaft bending machine including a movable center board construction adapted to have shafts adjacent thereto, means for bending the shafts, means operable by hand for adjusting the center board construction to the shafts, and means adapted to be put in engagement with said hand operated means for actuating the shaft bending means and the center board moving means.

10. A shaft bending machine including a table, a center board construction movable thereon adapted to have shafts adjacent thereto, means for bending the shafts, a screw shaft mounted in connection with the table, a traveling block on said screw shaft adapted to move said center board construction, a wheel loosely mounted on said shaft, a handle mounted in connection with said shaft for rotating the same by hand, means for locking the handle, means on the handle for locking said wheel with said shaft, and means for actuating said wheel, substantially as set forth.

11. A shaft bending machine including a table and center board construction movable thereon adapted to have shafts adjacent thereto, a screw shaft mounted in connection with the table, a traveling block on said shaft for moving the center board construction, a disk secured on the outer end of said shaft provided with a pair of outwardly extending flanges and said disk having a hole through it, a wheel mounted in connection with said disk to be independently revolved and provided with a series of holes adapted to register with the hole in said disk, a hand lever pivotally mounted between the flanges on said disk, a pin in said lever adapted to project through the hole in the disk and into one of the holes in said wheel to lock the two into operative engagement, and means on said lever for holding them in the locked position.

12. A shaft bending machine including a plate, means for mounting a pair of shafts thereacross to be bent, shaping blocks adjacent said shafts, pressure bars at the sides of said shafts movable towards each other for forcing said shaping blocks against the shafts, and bearing plates on which said pressure bars are located that are mounted on said plates so as to be horizontally adjustable.

13. A shaft bending machine including a plate, means for mounting thereacross a pair of shafts to be bent, shaping blocks adjacent said shafts, pressure bars at the sides of said shafts movable towards each other for forcing said shaping blocks against the shafts, shafts extending up through said plate, means on said shafts for reciprocating said pressure bars, bearing plates mounted on said plate and pivoted to said shafts so as to be horizontally adjustable, and means for locking said plates in their adjusted positions.

14. A shaft bending machine including a table on which shafts may be mounted for bending, a removable plate adjacent said shafts, flexible means connected at one end with said removable plate and at the other end carrying an abutment against which the ends of the shafts may be forced, a lever provided with a segmental shaper for forming the heels of the shafts, and flexible means connected with one end of the lever and passing under the heels of the shafts and connected with the table, substantially as set forth.

15. A bending machine including a table upon which shafts are adapted to be mounted for bending, a removable center board, flexible straps mounted in connection therewith carrying an abutment against which the ends of the shafts are forced, flexible means connected with the table under said flexible straps and extending beyond the ends of the same, a lever connected with the outer end of said second named flexible means and provided with a segmental shaper adapted to bear upon said shafts for forming the heels thereof, and a tie-rod connected at one end to said abutment and at the other end adapted to be connected with said removable center board whereby the heels of the shafts will be maintained in their bent position after said lever and shaper are removed.

In witness whereof, I have hereunto affixed my signature in the presence of the witnesses herein named.

GEORGE F. HARTLEY.

Witnesses:
V. H. LOCKWOOD,
O. M. GREENER.